US011260460B2

(12) United States Patent
Von Puttkammer et al.

(10) Patent No.: US 11,260,460 B2
(45) Date of Patent: Mar. 1, 2022

(54) STOP FOR A DRILLING, MILLING OR COUNTERSINKING TOOL

(71) Applicant: GUEHRING KG, Albstadt (DE)

(72) Inventors: Ingo Von Puttkammer, Messstetten (DE); Felix Rebholz, Stetten-Frohnstetten (DE)

(73) Assignee: Guehring KG, Albstadt (DE)

( * ) Notice: Subject to any disclaimer, the term of this patent is extended or adjusted under 35 U.S.C. 154(b) by 23 days.

(21) Appl. No.: 16/563,310

(22) Filed: Sep. 6, 2019

(65) Prior Publication Data

US 2020/0238398 A1 Jul. 30, 2020

Related U.S. Application Data

(63) Continuation of application No. PCT/EP2018/054781, filed on Feb. 27, 2018.

(30) Foreign Application Priority Data

Mar. 8, 2017 (DE) ..................... 10 2017 104 914.2

(51) Int. Cl.
*B23B 51/10* (2006.01)
(52) U.S. Cl.
CPC ...... *B23B 51/104* (2013.01); *B23B 2260/008* (2013.01); *B23C 2255/12* (2013.01)
(58) Field of Classification Search
CPC .......... B23B 51/104; B23B 2260/0482; B23B 2260/048; B23B 2260/12; B23C 2255/12; B23C 2255/08; B23C 2255/00
See application file for complete search history.

(56) References Cited

U.S. PATENT DOCUMENTS 2,522,330 A * 9/1950 Wright ................. B23B 51/104
408/113
7,607,871 B1 10/2009 Nelson
(Continued)

FOREIGN PATENT DOCUMENTS

DE 552 110 6/1932
DE 101 54 434 B4 6/2003
(Continued)

OTHER PUBLICATIONS

International Search Report and Written Opinion of the International Searching Authority (and translation obtained WIPO) from a corresponding international patent application (PCT/EP2018/054781) dated Jun. 18, 2018, 15 pages.
(Continued)

*Primary Examiner* — Alan Snyder
(74) *Attorney, Agent, or Firm* — Burr & Brown, PLLC

(57) ABSTRACT

A stop for a rotating drilling, milling or countersinking tool comprising a stop sleeve coupled to a radial rolling bearing in such a way that it freely rotates about the tool, an outer bearing bush of the radial rolling bearing being attached to the stop sleeve and an inner bearing bush of the radial rolling bearing being attached to a shaft sleeve that can be attached to a tool shaft of the tool. An axial rolling bearing is also provided, a housing washer of the axial rolling bearing being supported on the stop sleeve and a shaft washer of the axial rolling bearing being supported on the shaft sleeve. In a secondary aspect, the invention relates to a drilling, milling or countersinking tool provided with such a stop.

11 Claims, 2 Drawing Sheets

(56) References Cited

U.S. PATENT DOCUMENTS 10,213,843 B2 2/2019 Rebholz
2017/0274459 A1 9/2017 Rebholz

FOREIGN PATENT DOCUMENTS

| DE | 10 2008 022 968 A1 | 8/2009 |
|----|--------------------|--------|
| GB | 488242 A | 7/1938 |
| GB | 554 343 A | 6/1943 |
| GB | 2 269 333 A | 2/1994 |
| WO | 2016/023944 A1 | 2/2016 |

OTHER PUBLICATIONS

DPMAregister from a corresponding German patent application (DE 10 2017 104 914.2) printed on Oct. 3, 2019, 2 pages.

* cited by examiner

STOP FOR A DRILLING, MILLING OR COUNTERSINKING TOOL

The invention relates to a stop for a rotating drilling, milling or countersinking tool, as well as to a tool, to the tool shank of which a stop is attached.

PRIOR ART

Stops for drilling, milling or countersinking tools, which are identified as so-called "microstop" adapters, are known from the prior art. These adapters usually comprise a drill shank for accommodation in a chuck of a turning machine or of a hand-held turning tool, and a bearing, by means of which a stop sleeve can rotate freely about a drilling, milling or countersunk head, which is inserted into the adapter, so that, upon reaching a predetermined penetration depth into a component, the stop sleeve can attach to the surface of the component, and the drilling, milling or countersunk head can rotate freely. Such stops are used in particular for countersinking or milling operations in the vehicle and aircraft construction.

During use, the drill shank of such microstop adapters is accommodated into a chuck of a drilling tool, for example of a drilling machine, or of a milling tool. The stop sleeve can be provided with an axial adjusting thread, by means of which the longitudinal position of the stop sleeve can be adjusted relative to the tool head, and the stop depth can thus be set. The adapter has an accommodation, for example a screw thread, a bayonet closure or a quick clamping device for accommodating the drilling, milling or countersunk head, to store them centrically in the stop sleeve. Known microstop adapters thus comprise a drill shank, and the stop sleeve, which is supported so as to rotate freely, and the tool head can be exchanged as necessary. A stop adapter comprising a drill shank is thus provided, in which a machining tool head can be used for the rotating machining A stop device comprising a tool shank, which comprises a freely rotatable stop sleeve, which can be rotated about a tool shank of the stop device by means of a single pivot bearing, follows from DE 101 54 434 B4. A drilling or milling tool can be inserted into the tool shank of the stop device and can be locked in a rotationally fixed manner.

GB 4 882 42 A discloses a stop adapter, which comprises a stop sleeve comprising a spindle shank, on which the stop sleeve is rotatably supported, and into which a tool, for example a countersinking tool bit, can be inserted. It is thus a generic, above-mentioned microstop adapter, which cannot be applied retroactively to a machining tool comprising a shank.

Further generic microstop adapter stop sleeves comprising adapter accommodations for a tool bit provided specifically for this purpose are provided in U.S. Pat. No. 7,607,871 B1 and in GB 22 693 33 A.

A plurality of embodiments of microstop adapters is illustrated, in turn, in DE 10 2008 022 968 A1, whereby a tool comprising a tool shank is illustrated as well, in the case of which the tool shank supports a threaded section, onto which an adjusting sleeve can be screwed and can be positionally secured by means of an Allen screw. The adjusting sleeve has a locking ring, onto which a stop sleeve can be latched with the adjusting sleeve by means of friction and can be dragged along in a rotational manner. The tool shank of the tool has to have a corresponding treaded section, so as to be able to attach the stop sleeve.

In the case of the known microstop adapters, the problem results that a poor concentricity of the tool head and thus an inferior drilling, countersinking or milling can thus occur due to the exchangeable insertion of the tool had into the adapter accommodation. In the case of a faulty accommodation or an accommodation play, respectively, between adapter and tool head, not only the concentricity, but also the angular position of the tool head in the bore depression can furthermore be changed disadvantageously, so that a machining quality is reduced. Different operating results can result as a function of the direction, in which an operator exerts pressure on the tool.

An improved stop for a rotating drilling, milling or countersinking tool, which comprises a stop sleeve, which is coupled to a sliding or rolling bearing so as to be freely rotatable about the tool, is described in WO 2016/023944 A1. A first bearing bush of the bearing supports the stop sleeve. A second bearing bush of the bearing is located on a shank sleeve in a rotationally fixed manner. The shank sleeve can be slid and attached to a shank of the tool.

A tool comprising a depth stop for countersinking holes for countersinking screws is illustrated in DE 552 110 A. A drill body provided with a Morse taper or the like has an axial bore for accommodating the countersinking shank and, adjacent thereto, a bore, which, advantageously, is slightly smaller, for the thrust spring. A countersinking stop, which consists of a solid body and the countersinking stop ring, which rests on it on ball bearings, is positioned on the external thread of the drill body. The shape, arrangement, and number of the ball bearings depends on the size and the circumferential speed of the countersink, wherein an inclined ball bearing is illustrated.

Based on the above-specified problem, the object is to embody a stop for a drilling, countersinking or milling tool, which provides for an optimal concentricity, a defined angular attachment position for the machining, and a precise limitation of the penetration depth, and which thus overcomes the above-mentioned disadvantages of the prior art.

This object is solved by means of a stop comprising the features of claim 1. Advantageous further developments of the invention are subject matter of the subclaims.

DISCLOSURE OF THE INVENTION

In a first aspect according to the invention, a stop for a rotating drilling, milling or countersinking tool is proposed, wherein a stop sleeve is provided, which is coupled to a radial rolling bearing, in particular a radial ball bearing, so as to rotate freely about the tool, and wherein an outer bearing bush of the radial rolling bearing is attached to the stop sleeve, and an inner bearing bush of the bearing is attached to a shank sleeve, which can be attached to a tool shank of the tool. It is proposed that an axial rolling bearing, in particular an axial ball bearing, is additionally provided, wherein a housing washer of the axial rolling bearing is supported on the stop sleeve, and a wave washer of the axial rolling bearing is supported on the shank sleeve.

In other words, a stop is proposed, which can be slid and attached directly onto a shank of a one-piece drilling, milling or countersinking tool. The shank sleeve couples the stop sleeve to the tool shank of a rotational tool, which can be inserted into the shank sleeve, via a radial rolling bearing as well as via an axial rolling bearing, wherein the support of the axial rolling bearing on the shank sleeve or on the stop sleeve, respectively, can take place directly as well as indirectly via intermediate elements, which may be present. The shank sleeve can be attached at an axial position of the tool shank in a rotationally fixed manner. The position of the shank sleeve on the tool shank and the position of the stop sleeve on the bearing bush define the penetration depth of the tool, up to which the stop sleeve attaches to a surface of a workpiece to be machined. If a penetration depth, which is determined thereby, is reached, a front-side stop ring of the stop sleeve sits on the tool surface, while the tool rotates freely with the shank sleeve in the interior, and the stop sleeve can rest on the component surface due to the rolling bearing coupling with the stop ring.

The shank of the tool can be clamped directly into a chuck of a turning machine or a drilling machine, so that an optimal concentricity is ensured. The attachment angle of the tool can be selected optimally, wherein the stop sleeve does not form an indirect connection between tool head and driving drilling tool, but only attaches to the shank of the tool. The depth stop is defined by the position of the shank sleeve on the drill shank as well as the relative axial position of the freely rotatable stop sleeve to the shank sleeve. Any turning tools can be retrofitted with a stop according to the invention.

Compared to a stop, which is known from the prior art, which only has one or a plurality of radial rolling bearings, the bearing play is significantly reduced in the axial direction by the additional use of an axial rolling bearing. Bores, millings or countersinkings with a higher precision and repetition accuracy with respect to the penetration depth can thus be produced.

It is possible to retrofit standard tools with a depth stop and to thus attain the advantage of the invention by means of the stop.

The axial rolling bearing can advantageously be arranged axially spaced apart from the radial rolling bearing. The concentricity of the stop is improved thereby, and a defined attachment angular position is attained. By means of the distance between the two rolling bearings, the stop sleeve can be aligned in an axially centered manner with respect to the shank sleeve and thus with respect to the tool shank of the tool, so that the angular position with respect to the tool axis is accurately defined by the stop when reaching the stop point. This improves the accuracy of the depth stop as well as the angular position of the drilling or milling tool when reaching the predetermined stop depth.

In an advantageous further development, the axial rolling bearing can be arranged on the side of the radial rolling bearing facing away from a tool head of the tool, viewed in the axial direction. The radial rolling bearing is thus located on a side of the stop facing the tool head or the workpiece, respectively. The guidance of the stop sleeve is further improved thereby.

In an advantageous further development, a bearing clamping screw can be arranged on a bearing clamping thread of the shank sleeve, wherein the radial rolling bearing and the axial rolling bearing are arranged in such a way that both rolling bearings can be clamped jointly by an adjustment of the bearing clamping screw.

This provides for a simple assembly of the bearings and facilitates a readjustment of the bearing play, which may be necessary. The bearing clamping screw can be arranged on an external thread of the shank sleeve as bearing clamping thread and can reduce an axial play of the bearing, so that an inhibition of the rotation of the stop sleeve with respect to the shank sleeve, among others, can also be set.

It has turned out to be advantageous in this context, when the stop sleeve has an axially acting clamping surface for the housing washer, and when the bearing clamping screw has an axially acting clamping surface for the wave washer, wherein both clamping surfaces face one another. An optimal force transmission, which is free from play, if possible, of forces, which act axially on the axial rolling bearing and which are created when attaching the stop sleeve onto the workpiece to be machined, to the shank sleeve and thus to the tool is attained thereby.

The stop sleeve can advantageously have an axially acting clamping surface for the outer bearing bush, and the shank sleeve can have an axially acting clamping surface for the inner bearing bush, wherein both clamping surfaces face one another. The combination of these two clamping surfaces in particular forms a counter bearing for the forces exerted by means of the bearing clamping screw. The clamping surface provided on the shank sleeve sensibly points in the direction of the clamping surface of the bearing clamping screw, so that the two rolling bearings and simultaneously also the stop sleeve is clamped between these clamping surfaces.

In an advantageous further development, the outer bearing bush can be adhered or pressed into the stop sleeve. In an advantageous further development, the inner bearing bush can be adhered or pressed onto the shank sleeve. The position of the stop sleeve with respect to the outer bearing bush or the position of the shank sleeve with respect to the inner bearing bush, respectively, can thus be secured by means of an adhesive or press connection. A metal adhesive can be used as adhesive, a press connection can advantageously be embodied as thermal shrink fit.

In an advantageous further development, the stop can comprise a locking nut, in particular a knurled nut, which can be screwed onto an adjusting thread of the tool shank, and which is designed for the counter-locking of the shank sleeve. The locking nut can effect a counter-locking of the shank sleeve on the tool shank, in particular when the shank sleeve is at least partially screwed to the tool shank by means of a screw connection, so that a stop depth can be secured and an unintentional changing of the stop depth is prevented. A large number of countersinking or milling operations with identical depth stop can thus be performed even in the case of a rough handling of the tool with the same operating result.

If a locking nut is present, it is further conceivable that the locking nut comprises a locking screw, by means of which the axial position of the locking nut can be secured on the tool shank. The locking screw can for example be aligned radially in the locking nut, can engage with a depression of the tool shank or can clamp the locking nut against the shank, and thus secure the rotational position of the locking nut on the tool shank.

In a secondary aspect, a drilling, milling or countersinking tool comprising a tool shank is proposed, wherein a stop according to one of the above-mentioned embodiments is attached to the tool shank. Such a tool can generally be embodied of a drilling, milling or countersinking tool according to the prior art, combined with an above-specified stop. The attachment of the shank sleeve to the tool shank can generally take place arbitrarily, an external thread, for example, can be provided on the tool shank, onto which an internal thread of the shank sleeve can be screwed, or the inner surface of the shank sleeve is adhered to an outer surface of the tool shank.

In an advantageous further development of the tool, the shank sleeve can be adhered, pressed, or clamped to the tool shank, which can in particular be thread-free. Any machining turning tool can be retrofitted with the stop. The shank sleeve can thus be adhered to the shank by means of an adhesive, in particular a metal adhesive, for example by means of a two-component metal adhesive, such as a 2K epoxy resin adhesive or 2K acrylate adhesive. Any setting position of the shank sleeve on the tool shank can thereby be set very easily and the adhesive can be cured, wherein a simple and cost-efficient attachment of the stop to a tool can be attained. An attachment by means of thermal shrink fitting is also conceivable, wherein a heated, widened shank sleeve is applied to a tool shank and is cooled down at a desired position, in order to provide a non-positive connection.

In the alternative, the tool shank can have an adjusting thread, onto which the shank sleeve and a locking nut, in particular a knurled nut, which is designed for the counter-locking of the shank sleeve, can be screwed. The stop can thus be changed. The stop can be offered, for example, as set comprising a plurality of different drilling, milling or countersinking tools. The stop can be offered individually or in combination with one or a plurality of rotary tools. One or a plurality of adapter sockets for adaptation to various shank diameters of tools can be included in the set. Drilling, milling or countersinking tools have different radii of the tool shank, depending on the type of use.

In advantageous manner, the locking nut can comprise a threaded tool shank or a tool quick-change shank. The locking nut can thus simultaneously form the closing of the tool in the direction of the chuck and can comprise a shank accommodation, for example a tool thread, for screwing into a chuck or a quick-change shank, for example a so-called clickchange shank. The countersinking tool is accommodated and secured in the stop and the stop connects the countersinking tool to the chuck. A tool can thereby be clamped in various chucks by accommodation into the stop.

Finally, the shank sleeve can also be attached to the tool shank by means of clamping connection, for example by mean of a clamping widening or a clamping collar, clamping screw or the like. The stop depth is defined by the axial position of the shank sleeve on the tool shank.

In a preferred embodiment, the shank sleeve can comprise at least one, in particular two or more radially acting clamping means in the drill shank area, which is located axially opposite the stop sleeve, by means of which clamping means the shank sleeve can be clamped with the tool shank in a rotationally fixed and axially securing manner. By means of a clamping attachment, a quick detachability of the stop from the drill shank can be attained and a quick exchange or an adjustment of the stop depth can be made possible. Additional attachment elements on the tool shank, such as threads, can furthermore be forgone by means of a clamping means, for example a clamp or a clamping screw. Standard milling, drilling or countersinking tools, to which the stop can be attached in a clamping manner, can thus be retrofitted with a stop.

In a preferred embodiment, one or a plurality of clamping screws, in particular Allen screws, which can preferably engage with radially aligned engagement depths of securing threads of the tool shank in a rotationally fixed and axially locking manner, can be used as clamping means. By means of clamping screws, in particular Allen screws, the shank sleeve can be attached to the tool shank at any position. If engagement depressions, for example countersinking depressions, are arranged on the tool shank, the Allen screws can engage with these depressions, wherein the shank sleeve is attached in a rotationally fixed manner at a defined position of the tool shank. In the alternative, radially aligned securing threads can be arranged in the tool shank, so that headless screws or Allen screws can be screwed into the securing thread in order to attach the shank sleeve to the tool shank. The attachment of the stop to a position of the tool shank, which is arranged specifically for this purpose, has the advantage that a stop depth, once set, can also be maintained when changing the tool. Allen screws can be loosened and tightened easily, so that a quick change of the tool is made possible. By means of a clamping of the shank sleeve, any stop depths of the tool can be set.

To adapt a stop to different tool shank diameters, it can be advantageous that one or a plurality of adapter bushes are provided, which can be inserted into the shank sleeve, in order to be able to adapt the inner diameter of the shank sleeve to a varying tool shank diameter. With one stop and a plurality of adapter bushes, a plurality of tools comprising different shank diameters can thus be provided with an identical stop, so that a universally exchangeable stop is proposed, which can be plugged, adhered to any tools or can be attached so as to clamp thereon. This lowers the acquisition costs and expands the range of application of the stop for a plurality of different applications. It is conceivable to assemble a set with one stop and one or a plurality of adapter bushes.

DRAWINGS

Further advantages follow from the present description of the drawing. Exemplary embodiments of the invention are illustrated in the drawing. The drawing, the description, and the claims include numerous features in combination. The person of skill in the art will advantageously also consider the features individually and will combine them to expedient further combinations.

Identical or similar components are numbered with identical reference numerals in the figures.

Figure 1A:
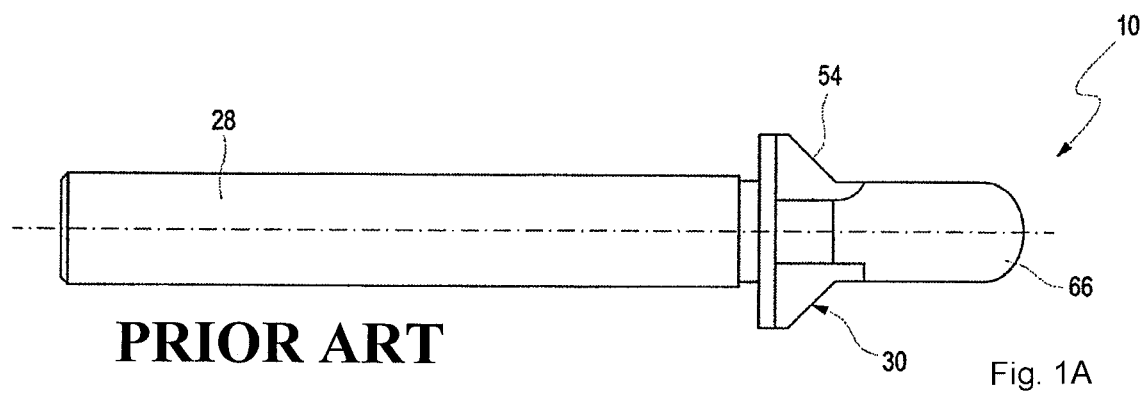
FIG. 1A shows a sectional illustration through a stop according to the prior art with side illustration of a tool, which can be used for this purpose.

FIG. 1A shows a stop deburring tool 50 according to the prior art. A countersinking tool or tool 10 illustrated in FIG. 1A comprises a tool shank 28 and a tool head 30, which has a rounded insertion pin 66 and a plurality of deburring or countersinking cutting edges 54, respectively.

Figure 1B:
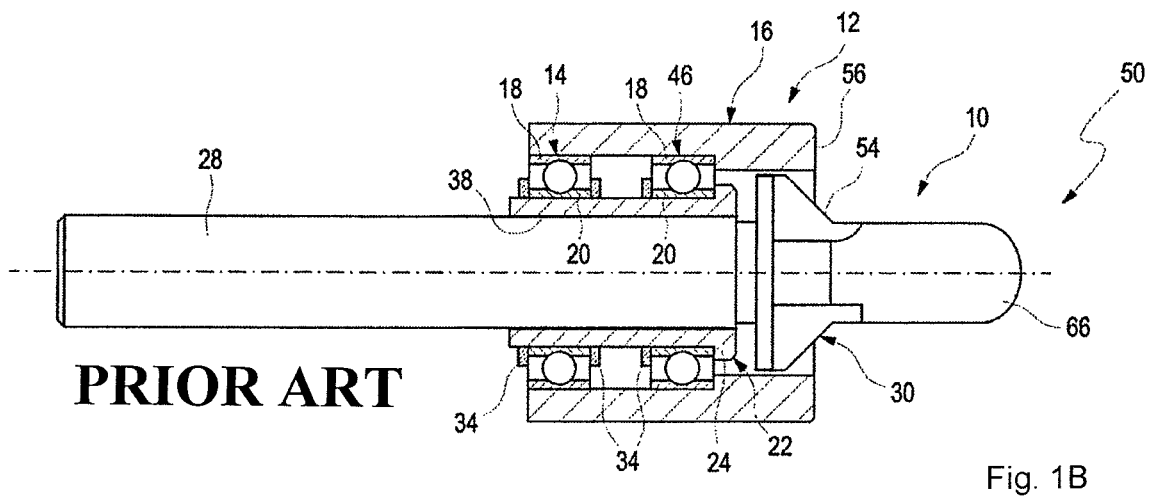
FIG. 1B shows a sectional illustration through a stop according to the prior art with side illustration of a tool, which can be used for this purpose.

As illustrated in FIG. 1B, a stop 12 attached to the tool 10 comprises a stop sleeve 16, which is supported so as to be rotatable freely about a shank sleeve 12 by means of a first and a second radial ball bearing 14, 46. The shank sleeve 22 can be slid axially onto the tool shank 28 all the way to the tool head 30, and can be connected in a rotationally fixed, non-positive manner to the shank 28 by means of an adhesive bond 38 at an axial point of the shank 28, which defines the stop depth of the tool head 30.

The outer bearing bushes 18 of the first and second radial ball bearing 14, 46 are adhered in the inner wall of the stop sleeve 16. The inner bearing bush 20 of the first radial ball bearing 14 is secured to the shank sleeve 22 by means of two bearing rings 34 and can nonetheless be adhered to the shank sleeve 22. The inner bearing bush 20 of the second ball bearing 46 is locked by means of a counter bearing ring 24 of the shank sleeve 22 and a bearing ring 34. The stop sleeve 16 can rotate with respect to the shank sleeve 22 via the two radial ball bearings 14, 46.

Figure 2:
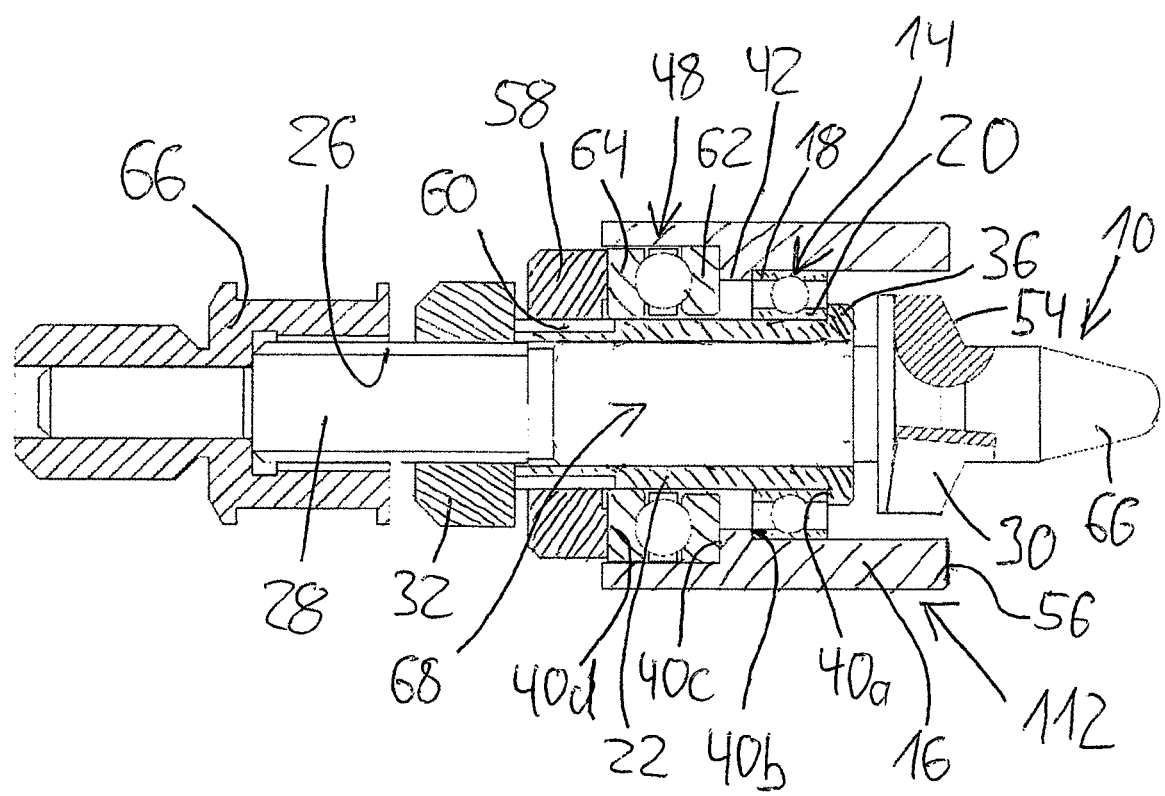
FIG. 2 shows an embodiment of a stop according to the invention, which is arranged on a tool, in a sectional illustration.

An embodiment of a stop 112 according to the present invention is illustrated in FIG. 2, which is arranged on a tool 10, which is designed as countersinking tool in the exemplary embodiment. It goes without saying that the tool can also be designed as drilling or milling tool.

On its tool shank 28, the tool 10 has an adjusting thread 26, which can be clamped into a chuck 66 of a turning machine or of a drilling machine.

The stop 112 comprises a stop sleeve 16, which is supported so as to be rotatable freely about a shank sleeve 22 by means of a radial ball bearing 14 and an axial ball bearing 48. An internal threaded section of the shank sleeve 22 is screwed to the adjusting thread 26 at least in some areas so as to define an axial position of the stop 112 on the tool shank 28. A locking nut 32, which secures the shank sleeve 22 in a rotationally fixed manner, is screwed onto the adjusting thread 26. By selecting a suitable longitudinal position of shank sleeve 22 and locking nut 32, the penetration depth of the tool 10 into a workpiece to be machined can be set.

In the alternative, it is conceivable that the stop 112 is pushed into the area of the tool head 30 beyond the tool shank 28 and the adjusting thread 26 onto a shank sleeve accommodating area 68 of the tool shank 28, and can be adhered in the shank sleeve accommodating area 68 or can be clamped against a stop by means of the locking nut 32. The shank sleeve accommodating area 68 can have a surface contour for locking the shank sleeve in a rotationally fixed manner, for example longitudinal markings.

The shank sleeve 22 has a collar 36, on which a clamping surface 40$a$ for the inner bearing bush 20 is provided. A multi-stage shoulder 42, on which a clamping surface 40$b$ for the outer bearing bush 18 and, axially opposite, a clamping surface 40$c$ for a housing washer 62 of the axial ball bearing 48 is provided, is embodied on the inner side of the stop sleeve 16.

On an axial end facing away from the tool head 30, the shank sleeve 22 has a bearing clamping thread 60. A bearing clamping nut 58, which has a clamping surface 40$d$ for a wave washer 64 of the axial ball bearing 48, is screwed onto the bearing clamping thread 60.

The clamping surfaces 40$a$-40$d$ act in the axial direction in such a way that the two ball bearings 14, 48, and simultaneously also the stop sleeve 16, are clamped between these clamping surfaces 40$a$-40$d$. The outer bearing bush 18 and/or the housing ring 62 can additionally be adhered to the stop sleeve 16 and/or the inner bearing bush 20 to the shank sleeve 22. By means of a rotation of the bearing clamping nut 58 against the shank sleeve 22, an axial play of the stop sleeve 16 with respect to the shank sleeve 22 as well as a bearing torque of the ball bearings 14, 48 can be set.

The stop sleeve 16 can rotate with respect to the shank sleeve 22 via the two ball bearings 14, 48.

In particular in the aircraft construction, a plurality of similar countersinkings need to be produced by means of hand-held countersinking tools. Depressions are in particular deburred by hand. An operator introduces the pin of the deburring countersinker and lowers the stop onto the component, until the stop is attached and stands still, i.e. does not move with respect to the rotating deburring tool. The surrounding surface around a drilling site is thereby protected and is not scratched, and the operator can attain a defined countersinking depth or deburring quality, respectively. The deburring tool can have a clamping chamfer or a clamping radius.

A plurality of different tools 10 can be retrofitted with a stop by means of a stop 112, wherein no malposition and no non-circular run of the tool head 30 can occur by means of a direct driving of the tool shank 28, and only the tool 10 can be changed in case of wear, and the same stop 112 can be used for a plurality of tools 10. The stop 112 can be adapted to various diameters of a tool shank 28 by means of adapter sleeves. The tool 10 is clamped directly by means of a chuck of a turning or drilling machine and the depth stop can be set easily by means of an axial position of the shank sleeve 22 on the tool shank 28.

On its axial end, the stop sleeve 16 has a front-side stop ring 56, which sits on the surface of a component to be machined, when reaching the depth stop, wherein the tool 10 can still rotate freely, because it is connected in a freely rotatable manner to the stop sleeve 16 by means of the two ball bearings 14, 48. Axial forces created when attaching the stop sleeve 16 are caught without play with the use of the axial ball bearing 48. An axial displacement between the stop sleeve 16 and the shank sleeve 22 is avoided almost completely, so that a predetermined penetration depth of the tool, independently of a pressing force exerted by the operator, can be maintained accurately.

REFERENCE LIST

10 tool
12 stop according to the prior art
14 first radial ball bearing
16 stop sleeve
18 outer bearing bush
20 inner bearing bush
22 shank sleeve
24 counter bearing ring
26 adjusting thread
28 tool shank
30 tool head
32 locking nut
34 bearing ring
36 collar
38 adhesive bond
40$a$-$d$ clamping surface
42 shoulder
46 second radial ball bearing
48 axial ball bearing
50 stop-deburring tool according to the prior art
54 cutting edge
56 stop ring
58 bearing clamping nut
60 bearing clamping thread
62 housing washer
64 wave washer
66 chuck
68 shank sleeve accommodating area of the tool shank
112 stop

The invention claimed is:
1. A stop for a rotating drilling, milling or countersinking tool comprising a stop sleeve, a first portion of the stop sleeve coupled to a radial rolling bearing so that the stop sleeve is capable of rotating freely about the tool, wherein an outer bearing bush of the radial rolling bearing is attached to the stop sleeve, and an inner bearing bush of the radial rolling bearing is attached to a shank sleeve, which can be attached to a tool shank of the tool, wherein an axial rolling bearing is additionally provided, wherein a housing washer of the axial rolling bearing is supported on a second portion of the stop sleeve, and a wave washer of the axial rolling bearing is supported on the shank sleeve.

2. The stop according to claim 1, wherein the axial rolling bearing is arranged axially offset to the radial rolling bearing.

3. The stop according to claim 2, wherein the axial rolling bearing is arranged on the side of the radial rolling bearing facing away from a tool head of the tool, viewed in the axial direction.

4. The stop according to claim 1, wherein a bearing clamping screw is arranged on a bearing clamping thread of the shank sleeve, wherein the radial rolling bearing and the axial rolling bearing are arranged in such a way that both rolling bearings can be clamped jointly by an adjustment of the bearing clamping screw.

5. The stop according to claim 1, wherein a bearing clamping screw is arranged on a bearing clamping thread of the shank sleeve, and the stop sleeve has an axially acting clamping surface for the housing washer, and the bearing clamping screw has an axially acting clamping surface for the wave washer, wherein both clamping surfaces face one another.

6. The stop according to claim 1, wherein the stop sleeve has an axially acting clamping surface for the outer bearing bush, and the shank sleeve has an axially acting clamping surface for the inner bearing bush, wherein both clamping surfaces face one another.

7. The stop according to claim 1, wherein the outer bearing bush is adhered or pressed into the stop sleeve.

8. The stop according to claim 1, wherein the inner bearing bush is adhered or pressed onto the shank sleeve.

9. A drilling, milling or countersinking tool comprising a tool shank, wherein a stop according to claim 1 is attached to the tool shank.

10. The tool according to claim 9, wherein the shank sleeve is adhered, pressed or clamped onto the tool shank.

11. The tool according to claim 9, wherein the tool shank has an adjusting thread, onto which the shank sleeve and a locking nut, which is designed for the counter-locking of the shank sleeve, is screwed.

\* \* \* \* \*